United States Patent
Kristensen

(10) Patent No.: US 12,066,008 B2
(45) Date of Patent: Aug. 20, 2024

(54) DEVICE FOR CONTROLLING HUMIDITY IN WIND TURBINES

(71) Applicant: Siemens Gamesa Renewable Energy A/S, Brande (DK)

(72) Inventor: Mikkel Aggersbjerg Kristensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 200 days.

(21) Appl. No.: 17/299,967

(22) PCT Filed: Oct. 31, 2019

(86) PCT No.: PCT/EP2019/079817
§ 371 (c)(1),
(2) Date: Jun. 4, 2021

(87) PCT Pub. No.: WO2020/120011
PCT Pub. Date: Jun. 18, 2020

(65) Prior Publication Data
US 2022/0018332 A1      Jan. 20, 2022

(30) Foreign Application Priority Data

Dec. 13, 2018  (EP) ..................................... 18212368

(51) Int. Cl.
*F03D 7/02* (2006.01)

(52) U.S. Cl.
CPC .... *F03D 7/0232* (2013.01); *F05B 2240/3052* (2020.08); *F05B 2240/3062* (2020.08); *F05B 2260/64* (2013.01); *F05B 2270/605* (2013.01)

(58) Field of Classification Search
CPC .................................................. F03D 7/0232
See application file for complete search history.

(56) References Cited

U.S. PATENT DOCUMENTS

| 4,692,095 A | 9/1987 | Lawson-Tancred |
| 5,106,265 A | 4/1992 | Holzem |

(Continued)

FOREIGN PATENT DOCUMENTS

| CN | 102094765 A | 6/2011 |
| CN | 102165185 A | 8/2011 |

(Continued)

OTHER PUBLICATIONS

International Search Report and Written Opinion in corresponding PCT Patent Application No. PCT/EP2019/079817 dated Feb. 5, 2020. 12 pages.

(Continued)

*Primary Examiner* — Kayla Mccaffrey
(74) *Attorney, Agent, or Firm* — Schmeiser, Olsen & Watts LLP

(57) ABSTRACT

A wind turbine including:
  a pressure supply system for operating the actuator of at least an aerodynamic device by means of a pressurized gas, wherein the pressure supply system includes:
  a pressure generator for pressurizing the pressurized gas,
  a pressure supply line connecting the pressure generator and the pneumatic actuator for providing the pressurized gas to the pneumatic actuator, the pressure supply line including a pressure reservoir,
  a return line connecting the pressure generator and the pneumatic actuator for returning the pressurized gas to the pressure generator, the return line including a return reservoir having a negative relative pressure, is provided.

7 Claims, 4 Drawing Sheets

(56) References Cited

U.S. PATENT DOCUMENTS

| | | | |
|---|---|---|---|
| 7,728,267 B2 | 6/2010 | Sanderson et al. | |
| 7,901,189 B2 | 3/2011 | Gupta et al. | |
| 8,157,533 B2 * | 4/2012 | Godsk | F03D 1/0641 |
| | | | 416/240 |
| 8,324,749 B2 | 12/2012 | Minami et al. | |
| 8,327,710 B2 | 12/2012 | Koste et al. | |
| 8,517,682 B2 * | 8/2013 | Hancock | F03D 7/0232 |
| | | | 416/240 |
| 8,851,840 B2 | 10/2014 | Hancock et al. | |
| 9,458,825 B2 * | 10/2016 | Brooks | F03D 7/022 |
| 2009/0097976 A1 | 4/2009 | Driver et al. | |
| 2011/0142633 A1 | 6/2011 | Haans et al. | |
| 2011/0217167 A1 | 9/2011 | Hancock et al. | |
| 2012/0086209 A1 | 4/2012 | Obrecht | |
| 2012/0141271 A1 | 6/2012 | Southwick | |
| 2018/0058424 A1 | 3/2018 | Egedal et al. | |
| 2018/0171975 A1 | 6/2018 | Röhm | |
| 2019/0032641 A1 | 1/2019 | Stoltenjohannes | |
| 2020/0011292 A1 | 1/2020 | Akay et al. | |

FOREIGN PATENT DOCUMENTS

| | | |
|---|---|---|
| CN | 107810140 A | 3/2018 |
| DE | 102015117032 A1 | 4/2017 |
| EP | 1320680 A1 | 6/2003 |
| EP | 1623111 A1 | 2/2006 |
| EP | 2321528 A2 | 5/2011 |
| EP | 2679808 A1 | 1/2014 |
| EP | 3290688 A1 | 3/2018 |
| EP | 3577338 A1 | 12/2019 |
| EP | 3577339 A1 | 12/2019 |
| EP | 3667063 A1 | 6/2020 |
| FR | 2290585 A1 | 6/1976 |
| WO | 2010023278 A2 | 3/2010 |
| WO | 2018041420 A1 | 3/2018 |
| WO | 2018162100 A1 | 9/2018 |
| WO | 2018162102 A1 | 9/2018 |

OTHER PUBLICATIONS

Extended European Search Report in corresponding European Patent Application No. 18212368.7 dated Jun. 12, 2019. 7 pages.

* cited by examiner

DEVICE FOR CONTROLLING HUMIDITY IN WIND TURBINES

CROSS-REFERENCE TO RELATED APPLICATIONS

This application is a national stage entry of PCT Application No. PCT/EP2019/079817 having a filing date of Oct. 31, 2019, which claims priority to European Patent Application No. 18212368.7, having a filing date of Dec. 13, 2018, the entire contents of which are hereby incorporated by reference.

FIELD OF TECHNOLOGY

The following relates to a device for controlling humidity from a compressed gas circuit in a wind turbine.

BACKGROUND

In wind turbine generators, the output power and structural loading is controlled by means of altering blade geometry relative to the wind, either by rotating the blade around its longitudinal axis, i.e. by regulating the pitch angle, by letting the blade flex passively (aeroelastic blades), or by actively controlling devices on the blade surface such as flaps or other flow regulating devices.

An example of such a flow regulating device is a vortex generator (VG) installed on the suction side of the wind turbine rotor blade.

Another example is shown in WO 2018/041420, which discloses a rotor blade comprising aerodynamic device for influencing the air flow flowing from the leading edge section of the rotor blade to the trailing edge section of the rotor blade, wherein the aerodynamic device is mounted at a surface of the rotor blade and comprises a pneumatic or hydraulic actuator, such as a bladder or a cavity of which the volume depends on the pressure of the fluid being present inside the pneumatic or hydraulic actuator.

In general, a flow regulating device may be considered to comprise a device which is capable of enhancing the lift coefficient of the aerofoil section, for example by increasing the level of energy of the boundary layer of the rotor blade.

Systems for regulating the pitch angle can be split into two categories: electro-mechanical and electro-hydraulic. As both types require one or more volumes of oil, they are typically confined within the hub.

For active aerodynamic devices on the blade surface, the presence of oil represents a significant environmental risk, eliminating the option of hydraulic actuation, whilst lightning strikes are likely to render any electric drive at the blade surface inoperable. Mechanical links such as drawbars or axles are not practicable due to the flexibility of the blade itself, effectively leaving pneumatic actuation as the only efficient means of operating such devices.

However, any water content in the pressurized supply air, which condensates in the blade surface device or connections leading to it, may be impossible to retract from within the device to the pneumatic supply and control unit in the hub or blade root, due to the centripetal force required to bring the water back to the hub.

Other potential solutions such as pressure condensation or membrane water separators require a pressure significantly higher than what is needed and desirable in the actuators for the active aerodynamic devices, causing significantly higher energy consumption and component stresses.

Existing dehumidifiers for compressed air are all limited from operating in the hub of a wind turbine due to either the operational temperature range specified or the rotation of the hub.

Hence, it is desirable to overcome the above inconveniences by providing an improved device for minimizing the water content in the pressurized supply air used for the actuation of aerodynamic devices on the blade surface or, alternatively, to provide extraction of humidity downstream of the active aerodynamic device, e.g. closer to the blade tip.

SUMMARY

An aspect of the present invention, it is provided a wind turbine comprising:
at least one rotor blade,
at least one aerodynamic device for influencing the airflow flowing from the leading edge section of the rotor blade to the trailing edge section of the rotor blade, wherein the aerodynamic device is mounted at a surface of the rotor blade,
a pneumatic actuator of the aerodynamic device for actuating the aerodynamic device at least between a first protruded configuration and a second retracted configuration,
a pressure supply system for operating the actuator by means of a pressurized gas,
wherein the pressure supply system comprises:
a pressure generator for pressurizing the pressurized gas,
a pressure supply line connecting the pressure generator and the pneumatic actuator for providing the pressurized gas to the pneumatic actuator, the pressure supply line comprising a pressure reservoir,
a return line connecting the pressure generator and the pneumatic actuator for returning the pressurized gas to the pressure generator, the return line comprising a return reservoir having a negative relative pressure.

The pressure generator may be a compressor.

Unlike dehumidifiers for continuous dehumidification of process air, the solution proposed through the present invention does no add any continuous energy consumption in the form of elevated system pressure or a pressure drop in the flow of the pressurized gas.

The pressurized gas may be for example pressurized air.

Compared to membrane dehumidifiers and pressure condensation, system pressure can be reduced by as much as 90%, thus reducing energy consumption.

According to embodiments of the present invention, the pressure supply system further comprises a regeneration line connecting a source of gas to the return line, the regeneration line including a check valve configured for opening and putting in communication the source of gas to the return line whenever the negative relative pressure in the return reservoir decreases up to a predefined threshold value.

The source of gas may be an external ambient providing fresh air containing humidity.

Over time the permeability of seals, hoses etc. of the pressure supply system may lead to some loss of pressurized gas from the system. This can eventually lead to a low pressure in the pressure reservoir and a lower negative relative pressure in the return reservoir.

The regeneration line may provide fresh air in the pressure supply system from the external ambient through the check valve.

According to embodiments of the present invention, the regeneration line further comprises a desiccant volume including a desiccant, the desiccant volume being interposed between the check valve and the return line.

The desiccant volume may be a tube or a chamber. The desiccant may provide dehumidification of the fresh air entering the pressure supply system from the external ambient through the check valve.

According to an embodiment of the present invention, the pressure supply system comprises an initialization by-pass interposed between the pressure supply line and the return line. The initialization by-pass may include:
- a service valve connected to the pressure supply line between the pressure reservoir and the pneumatic actuator,
- a coupling for connecting the initialization by-pass to a source of dehumidified gas.

During initialization (filling) of the system, the coupling allows the connection of a larger capacity dehumidification system, which is not present during normal operation and thus not required on function during operation. Alternatively, the source of dehumidified gas may be a pressurized reservoir.

The initialization by-pass may branch off from the regeneration line, in particular from a section of the regeneration line comprised between the check valve and the desiccant volume.

According to another embodiment of the present invention, the initialization by-pass is not present and the pressure supply system comprises a service branch including the service valve, the service branch being connected to the pressure supply line between the pressure reservoir and the pneumatic actuator. In such embodiment the regeneration line may comprise a coupling for connecting the check valve to a source of dehumidified gas.

In such embodiment the service valve relieves the pressure reservoir to the ambient and the coupling on the inlet provides a connection to a source of dehumidified gas during initialization of the system.

BRIEF DESCRIPTION OF THE DRAWINGS

Some of the embodiments will be described in detail, with reference to the following figures, wherein like designations denote like members, wherein.

DETAILED DESCRIPTION

The drawings are in schematic form. Similar or identical elements are referenced by the same or different reference signs.

Figure 1:
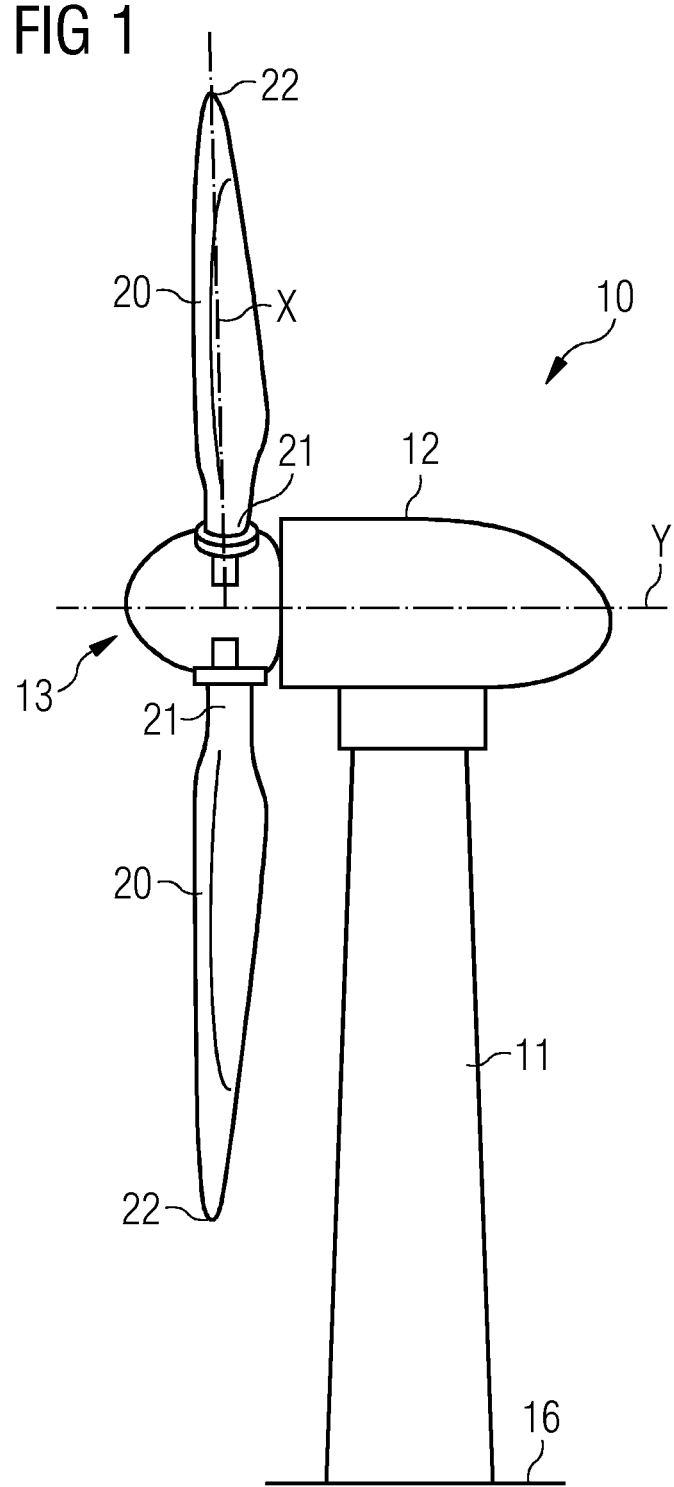
FIG. 1 depicts a wind turbine.

FIG. 1 shows a conventional wind turbine 10 for generating electricity. The wind turbine 10 comprises a tower 11 which is mounted on the ground 16 at one end. At the opposite end of the tower 11 there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a rotor axis Y. When not differently specified, the terms axial, radial and circumferential in the following are made with reference to the rotor axis Y.

The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 20 (in the embodiment of FIG. 1, the wind rotor comprises three blades 20, of which only two blades 20 are visible) mounted on the hub 13. The blades 20 extend substantially radially with respect to the rotational axis Y.

Each rotor blade 20 is usually mounted pivotable to the hub 13, in order to be pitched about respective pitch axes X. This improves the control of the wind turbine and in particular of the rotor blades by the possibility of modifying the direction at which the wind is hitting the rotor blades 20. Each rotor blade 20 is mounted to the hub 13 at its root section 21. The root section 21 is opposed to the tip section 22 of the rotor blade.

Figure 2:
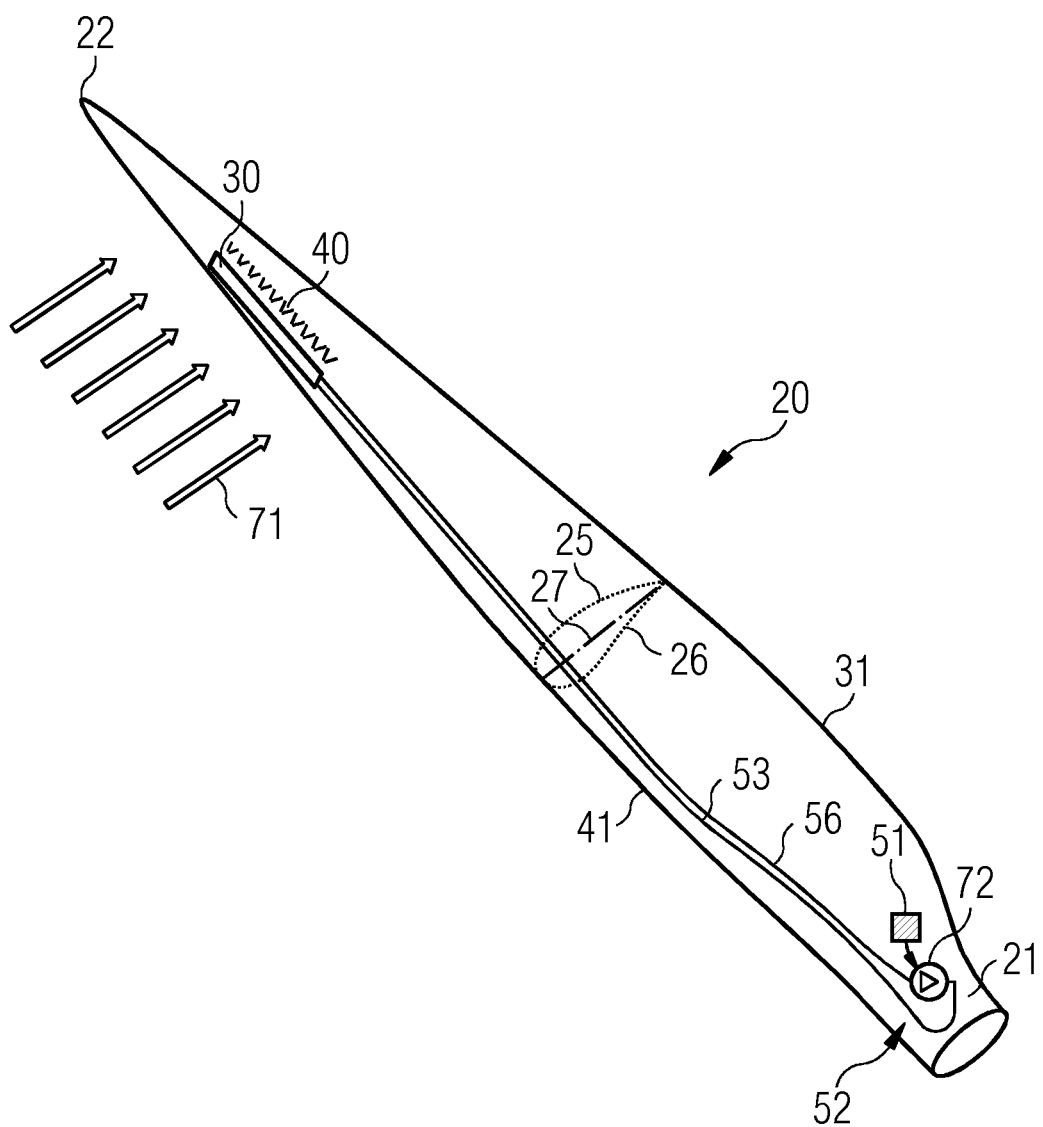
FIG. 2 depicts a rotor blade of a wind turbine with an aerodynamic device.

FIG. 2 illustrates the rotor blade 20 comprising an aerodynamic device 30 in the form of an actuated spoiler.

Between the root section 21 and the tip section 22 the rotor blade 20 furthermore comprises a plurality of aerofoil sections for generating lift. Each aerofoil section comprises a suction side 25 and a pressure side 26. The aerofoil shape of the aerofoil portion is symbolized by one aerofoil profile which is shown in FIG. 2 and which illustrates the cross-sectional shape of the rotor blade at this spanwise position. Also note that the suction side 25 is divided or separated from the pressure side 26 by a chord line 27 which connects a leading edge 41 with a trailing edge 31 of the rotor blade 20.

The aerodynamic device 30 is arranged on the suction side 25 between the leading edge 41 and the trailing edge 31.

According to other embodiments of the present invention (not shown in the attached figures), the aerodynamic device is in the form of an actuated flap, i.e. an aerodynamic device installed at the trailing edge 31 of the rotor blade 20.

According to other embodiments of the present invention (not shown in the attached figures), the blade 20 comprises a plurality of aerodynamic devices 30.

The aerodynamic device 30 in FIG. 2 is movable by means of a pneumatic actuator 34.

The aerodynamic device 30 in FIG. 2 is movable by means of a pressure supply line 53 connected to a pneumatic actuator 34. According to the embodiment of the attached figures, the pneumatic actuator 34 is realized as a hose. The hose 34 comprises an elastic outer skin, such that it can inflate and deflate reversibly and during many cycles when operated by means of the pressure supply line 53.

A pressure supply system 52 for operating the pneumatic actuator by means of a pressurized fluid, for example pressurized air or other pressurized gas. In this context, pressurized fluid not only comprises positive pressure but also negative pressure, wherein fluid is sucked (or "drawn") out of the pressure hose of the aerodynamic device 30.

The pressure supply system 52 comprises a pressure supply line 53 and a return line 56 and is controlled by a control unit 51. The pressure supply line 53 and the return line 56 could be in practice realized as tubes or pipes which do not significantly change their volume. The pressure supply line 53 and the return line 56 may be realized as a single line or, alternatively, as separate lines. The control unit 51 is responsible for setting a specific pressure at the pressure supply system 52 which subsequently leads to a certain predetermined pressure at the aerodynamic device 30.

In the example shown in FIG. 2, the control unit 51 and the pressure supply system 52 are located in the root section 21 of the rotor blade 20. According to other embodiments of the present invention (not shown in the attached figures), these parts could also be at least partially placed elsewhere in the wind turbine, such as e.g. in the hub 13 of the wind turbine 10.

The rotor blade 20 additionally comprises a flow regulating unit 40 comprising multiple pairs of vortex generators.

The flow regulating unit 40 are arranged on the suction side 25 of the blade 20 between the aerodynamic device 30 and the trailing edge 31.

According to other embodiments of the present invention (not shown in the attached figures), the flow regulating unit 40 are arranged on the suction side 25 of the blade 20 between the leading edge 41 and the aerodynamic device 30.

According to other embodiments of the present invention (not shown in the attached figures), the flow regulating unit 40 are not present and only the aerodynamic device 30 is used to regulate the flow on the surface of the blade 20.

Figure 3:
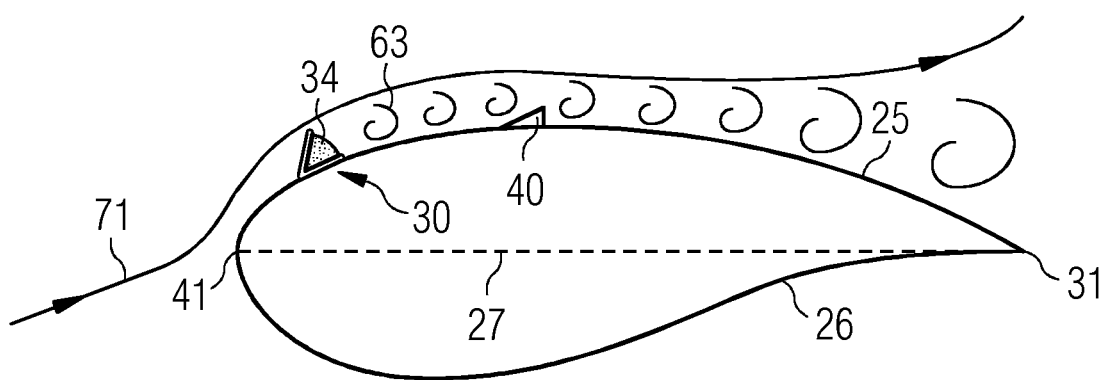
FIG. 3 depicts a radial section of the rotor blade of FIG. 2.

FIG. 3 shows the aerodynamic device 30 of FIG. 2 in a first protruded configuration, corresponding to an inflated configuration of the pneumatic actuator 34.

In the first configuration the aerodynamic device 30 deviates the airflow 71 which is flowing from the leading edge 41 to the trailing edge 31 of the rotor blade.

The aerodynamic device 30 in the first protruded configuration induces stall. This is visualized with relatively large vortices 63 downstream of the aerodynamic device 30. A consequence of the induced stall is a decrease in lift of the rotor blade and, consequently, a reduced loading of the rotor blade and related components of the wind turbine.

Figure 4:
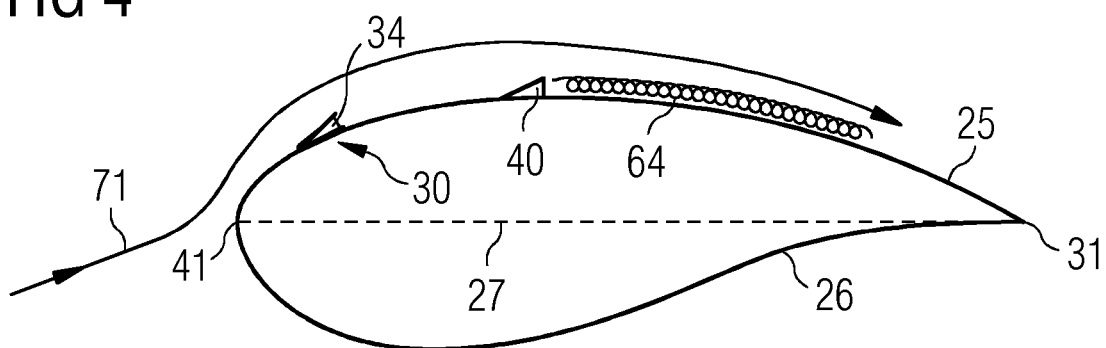
FIG. 4 depicts a radial section of the rotor blade of FIG. 2.

FIG. 4 shows the aerodynamic device 30 in a second retracted configuration, i.e. moved downwards towards the surface of the rotor blade 20, corresponding to a deflated configuration of the pneumatic actuator 34.

In this second configuration, the airflow 71 flowing across the aerodynamic device 30 remains attached to the surface of the rotor blade 20, thus that no flow separation, i.e. stall, occurs. As a consequence, the lift of the rotor blade increases. Re-energizing vortices 64 are generated in the boundary layer by the vortex generators 40, which have the effect of helping increasing the lift. As a result, the highest lift values can be achieved.

By operating the pneumatic actuator 34 of the aerodynamic device 30 through the pressure supply line 53, the aerodynamic device 30 can be moved between the first protruded configuration and the second retracted configuration in order to vary the aerodynamic properties of the blade as desired and requested when operating the wind turbine 10.

Figure 5:
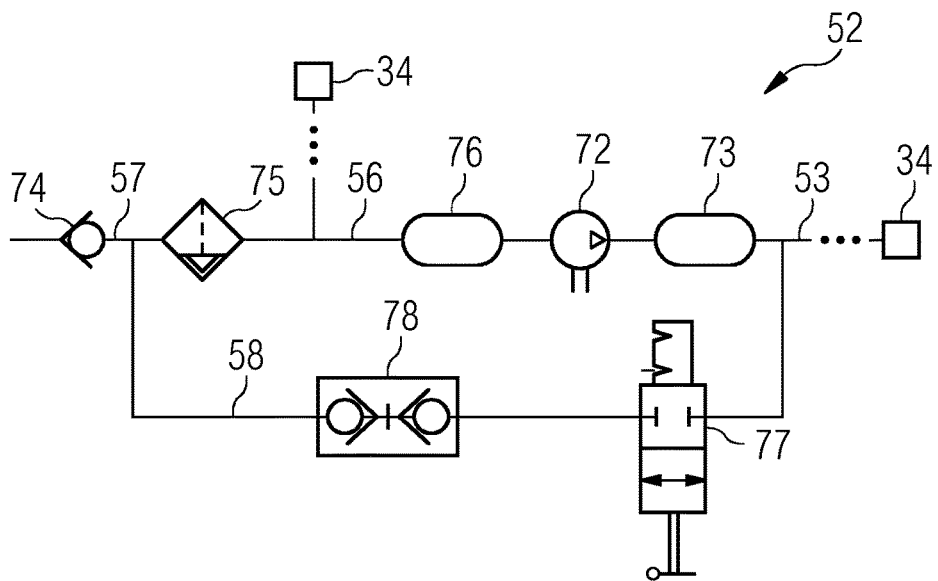
FIG. 5 depicts a first embodiment of a pressure supply system for the aerodynamic device of FIG. 2.

FIG. 5 schematically shows a first embodiment of the pressure supply system 52.

The pressure supply system 52 comprises:
a compressor 72 for pressurizing the pressurized gas,
the pressure supply line 53 connecting the compressor 72 and the pneumatic actuator 34 for providing the pressurized gas to the pneumatic actuator 34,
the return line 56 connecting the compressor 72 and the pneumatic actuator 34 for returning the pressurized gas to the compressor 72.

The pressure supply line 53 comprises a pressure reservoir 73. In the embodiment of FIG. 5 the pressure reservoir 73 is provided immediately downstream the compressor 72.

The return line 56 comprises a return reservoir 76 having a negative relative pressure. In the embodiment of FIG. 5 the return reservoir 76 is provided immediately upstream the compressor 72.

The pressure supply system 52 further comprises a regeneration line 57 connecting a source of gas containing humidity to the return line 56. For example the source of gas may be an external ambient providing fresh air to the return line 56. The regeneration line 57 includes a check valve 74 configured for opening and putting in communication the source of gas to the return line 56 whenever the negative relative pressure in the return reservoir 76 decreases up to a predefined threshold value.

The regeneration line 57 further comprises a desiccant volume 75 including a desiccant, the desiccant volume 75 being interposed between the check valve 74 and the regeneration line 57, in order to absorb the humidity contained in the gas entering the pressure supply system 52 from the source of gas connected to the check valve 74.

The pressure supply system 52 further comprises an initialization by-pass 58 interposed between the pressure supply line 53 and the return line 56. The initialization by-pass 58 branches off from a section of the regeneration line 57, comprised between the check valve 74 and the desiccant volume 75, and it is connected to the pressure supply line 53 between the pressure reservoir 73 and the pneumatic actuator 34.

The initialization by-pass 58 comprises a distribution service valve 77 and a coupling 78 for connecting the initialization by-pass 58 to a source of dehumidified gas for initializing (filling) the pressure supply system 52 before starting of operations.

Figure 6:
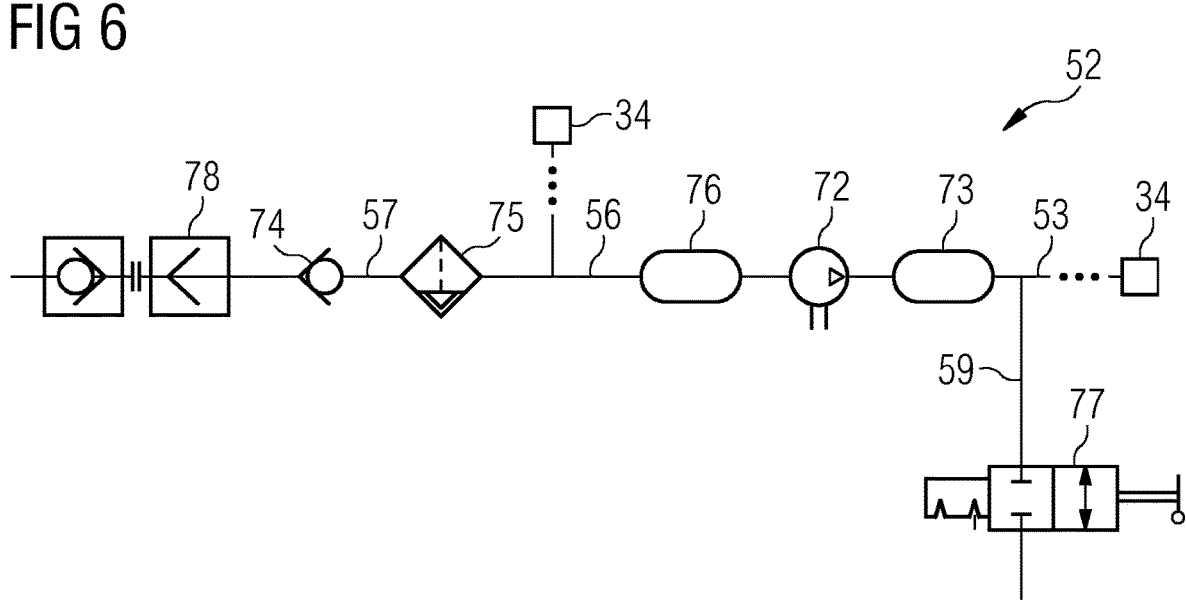
FIG. 6 depicts a second embodiment of a pressure supply system for the aerodynamic device of FIG. 2.

FIG. 6 schematically shows a second embodiment of the pressure supply system 52. With reference to the first embodiment, in the second embodiment the initialization by-pass 58 is not present. The pressure supply system 52 comprises a service branch 59 connected to the pressure supply line 53 between the pressure reservoir 73 and the pneumatic actuator 34. The service branch 59 includes the service valve 77. In the second embodiment, the service valve 77 relieves the pressure reservoir 73 to the external ambient. The regeneration line 57 comprises a coupling 78 for connecting the check valve 74 to a source of dehumidified gas during for initializing (filling) the pressure supply system 52 before starting of operations.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A wind turbine comprising:
at least one rotor blade;
at least one aerodynamic device for influencing an airflow flowing from a leading edge section of the at least one rotor blade to a trailing edge section of the at least one rotor blade, wherein the at least one aerodynamic device is mounted at a surface of the at least one rotor blade;

a pneumatic actuator of the at least one aerodynamic device for actuating the at least one aerodynamic device at least between a first protruded configuration and a second retracted configuration;

a pressure supply system for operating the pneumatic actuator by means of a pressurized gas;

wherein the pressure supply system comprises:

a pressure generator for pressurizing the pressurized gas;

a pressure supply line connecting the pressure generator and the pneumatic actuator for providing the pressurized gas to the pneumatic actuator, the pressure supply line comprising a pressure reservoir;

a return line connecting the pressure generator and the pneumatic actuator for returning the pressurized gas to the pressure generator, the return line comprising a return reservoir having a negative relative pressure; and a regeneration line directly connected to the return line for connecting a source of gas to the return line;

wherein the regeneration line includes a check valve configured for opening and putting in communication the source of gas to the return line whenever the negative relative pressure in the return reservoir decreases up to a predefined threshold value.

2. The wind turbine according to claim 1, wherein the regeneration line comprises a desiccant volume including a desiccant, the desiccant volume being interposed between the check valve and the regeneration line.

3. The wind turbine according to claim 2, wherein the pressure supply system comprises a service branch including a service valve, the service branch being connected to the pressure supply line between the pressure reservoir and the pneumatic actuator.

4. The wind turbine according to claim 3, wherein the pressure supply system comprises an initialization by-pass including the service branch, the service valve and a coupling for connecting the initialization by-pass to a source of dehumidified gas, the initialization by-pass being interposed between the pressure supply line and the return line.

5. The wind turbine according to claim 4, wherein the initialization by-pass branches off from the regeneration line.

6. The wind turbine according to claim 5, wherein the initialization by-pass branches off from a section of the regeneration line comprised between the check valve and the desiccant volume.

7. The wind turbine according to claim 3, wherein the service valve connects a source of gas to the pressure supply line and the regeneration line comprises a coupling for connecting the check valve to a source of dehumidified gas.

* * * * *